United States Patent
Uchida et al.

(10) Patent No.: US 12,398,999 B2
(45) Date of Patent: Aug. 26, 2025

(54) SHAPE MEASURING DEVICE

(71) Applicant: HAMAMATSU PHOTONICS K. K., Hamamatsu (JP)

(72) Inventors: Keisuke Uchida, Hamamatsu (JP); Munenori Takumi, Hamamatsu (JP); Naoaki Kato, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 55 days.

(21) Appl. No.: 18/277,839

(22) PCT Filed: Jan. 13, 2022

(86) PCT No.: PCT/JP2022/000921
§ 371 (c)(1),
(2) Date: Aug. 18, 2023

(87) PCT Pub. No.: WO2022/185731
PCT Pub. Date: Sep. 9, 2022

(65) Prior Publication Data
US 2024/0060772 A1    Feb. 22, 2024

(30) Foreign Application Priority Data
Mar. 5, 2021 (JP) .................. 2021-035091

(51) Int. Cl.
*G01B 11/26* (2006.01)
(52) U.S. Cl.
CPC .................... *G01B 11/26* (2013.01)
(58) Field of Classification Search
CPC ..... G01B 11/25; G01B 11/2522; G01B 11/26; G06T 7/521

(Continued)

(56) References Cited

U.S. PATENT DOCUMENTS

| | | | | |
|---|---|---|---|---|
| 2003/0052169 A1* | 3/2003 | Tsikos | ................... | G06V 20/62 235/454 |
| 2008/0170238 A1* | 7/2008 | Ochi | ..................... | G01B 11/25 356/610 |

(Continued)

FOREIGN PATENT DOCUMENTS

| | | |
|---|---|---|
| CN | 111711820 A | 9/2020 |
| JP | 2017-123533 A | 7/2017 |
| JP | 2018-139151 A | 9/2018 |

OTHER PUBLICATIONS

International Preliminary Report on Patentability mailed Sep. 14, 2023 for PCT/JP2022/000921.

(Continued)

*Primary Examiner* — Sunghee Y Gray
(74) *Attorney, Agent, or Firm* — Faegre Drinker Biddle & Reath LLP

(57) ABSTRACT

A shape measurement apparatus includes a light source, an irradiation optical system, an imaging optical system, a spatial light modulator, a focusing optical system, a linear sensor, and a processing unit. The irradiation optical system forms the light into a line shape and irradiates an object. The imaging optical system forms an image of the light reflected by the object. The spatial light modulator, in which a one-dimensional intensity modulation pattern is set on a light modulation plane, spatially intensity-modulates and outputs the light. The focusing optical system focuses the light output from the spatial light modulator in a line shape. The linear sensor receives the light focused in the line shape by pixels. The processing unit performs analysis by the compressive sensing technique for each of the pixels based on the intensity modulation pattern and an output signal from the linear sensor.

3 Claims, 20 Drawing Sheets

(58) Field of Classification Search
USPC ......................................................... 356/601
See application file for complete search history.

(56) References Cited

U.S. PATENT DOCUMENTS

2014/0285625 A1* 9/2014 McGarry ............... H04N 25/70
348/46
2019/0317315 A1 10/2019 Wang et al.

OTHER PUBLICATIONS

Harutaka, Shiomi et al., "Proposal for vector-pixel imaging," Optics & Photonics Japan 2020 Abstract 17aB7, 2020.
Wang, Jian et al., "LiSens—A Scalable Architecture for Video Compressive Sensing," ICCP, IEEE, Jul. 30, 2015, pp. 1-9.

* cited by examiner

Fig.2
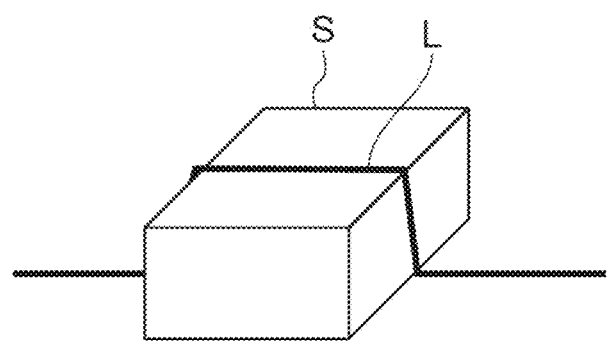
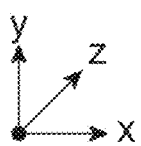

SHAPE MEASURING DEVICE

TECHNICAL FIELD

The present disclosure relates to a shape measurement apparatus for measuring a shape of an object.

BACKGROUND ART

There is a light section method as a technique for measuring a shape of an object. In the light section method, light output from a light source is formed into a line shape extending in one direction and the object is irradiated with the light, the light reflected by the object is received and imaged by an area sensor (an image sensor in which a plurality of pixels are arrayed two-dimensionally), and a two-dimensional image acquired by the imaging is analyzed to measure the shape of the object.

When the image acquired by the imaging is analyzed, an irradiation position of the line-shaped light on the object is obtained by performing centroid operation for each column. Further, a three-dimensional shape of the object can be measured by relatively moving the object, and obtaining the shape of the object at each position when moving the object.

The three-dimensional shape measurement by the light section method is used, for example, for product inspection in a factory line, and is used in various product inspection such as automobile, steel, architecture, and food industry. As automation of manufacture and inspection progresses due to factory automation and the like, the product inspection using the light section method becomes increasingly important.

In the image analysis by the light section method, the image analysis is performed after reading out signals of all pixels, although the number of pixels having necessary information (information on the irradiation position of the line-shaped light on the object) in the image is very small compared to the total number of pixels.

On the other hand, when the number of pixels having necessary information in the image is very small (when the image is sparse) compared to the total number of pixels, the number of pixels from which the signals are to be read out can be reduced by applying a compressive sensing technique.

For example, by using a technique described in Non Patent Document 1, the shape of the object can be measured by spatially intensity-modulating the image of the reflected light from the object by a two-dimensional spatial light modulator, forming the modulated light into a line shape by a cylindrical lens, receiving and imaging the light by a linear sensor (an image sensor in which a plurality of pixels are arrayed one-dimensionally), and analyzing the one-dimensional image acquired by the imaging by the compressive sensing technique.

CITATION LIST

Non Patent Literature

Non Patent Document 1: Shiomi Harutaka et al., "Proposal for vector-pixel imaging", The Optical Society of Japan, Optics & Photonics Japan 2020, Abstract 17aB7

SUMMARY OF INVENTION

Technical Problem

The shape measurement using the technique described in Non Patent Document 1 has sparsity of the entire image as a constraint, and thus, accuracy of image reconstruction is low.

An object of an embodiment is to provide a shape measurement apparatus capable of reconstructing a shape of an object with high accuracy using the light section method and the compressive sensing technique.

Solution to Problem

An embodiment is a shape measurement apparatus. The shape measurement apparatus is an apparatus for measuring a shape of an object, and includes (1) a light source for outputting light; (2) an irradiation optical system for forming the light output from the light source into a line shape extending in a first direction, and irradiating an object with the light; (3) an imaging optical system for inputting and forming an image of the light with which the object is irradiated by the irradiation optical system and reflected by the object in a direction different from an irradiation direction; (4) a spatial light modulator in which a one-dimensional intensity modulation pattern in a direction different from the first direction is set, and for inputting the light passed through the imaging optical system, and spatially intensity-modulating and outputting the input light based on the intensity modulation pattern; (5) a focusing optical system for inputting the light output from the spatial light modulator, and focusing the input light in a line shape extending in the first direction; (6) a linear sensor including a plurality of pixels each including a photodiode and arrayed one-dimensionally, and for receiving the light focused in the line shape by the focusing optical system by the plurality of pixels, and outputting a signal according to a light receiving amount of each of the plurality of pixels; and (7) a processing unit for obtaining a shape of the object by performing analysis by a compressive sensing technique for each of the plurality of pixels of the linear sensor based on the signal output from the linear sensor when the intensity modulation pattern is set to each of a plurality of intensity modulation patterns in the spatial light modulator.

An embodiment is a shape measurement apparatus. The shape measurement apparatus is an apparatus for measuring a shape of an object, and includes (1) a light source for outputting light; (2) an irradiation optical system for forming the light output from the light source into a line shape extending in a first direction, and irradiating an object with the light; (3) an imaging optical system for inputting and forming an image of the light with which the object is irradiated by the irradiation optical system and reflected by the object in a direction different from an irradiation direction; (4) an area sensor including a plurality of pixels each including a photodiode and arrayed two-dimensionally, and for receiving the light passed through the imaging optical system by the plurality of pixels, integrating a signal according to a light receiving amount of each of the pixels in a row in which a control signal applied to each row has a first logical value in a column direction, and outputting the signal for each column; and (5) a processing unit for obtaining a shape of the object by performing analysis by a compressive sensing technique for each column of the area sensor based on the signal integrated and output for each column from the area sensor when the control signal is set to each of a plurality of patterns of the control signal in the area sensor.

Advantageous Effects of Invention

According to the shape measurement apparatus of the embodiments, a shape of an object can be reconstructed with high accuracy using the light section method and the compressive sensing technique.

BRIEF DESCRIPTION OF DRAWINGS

FIG. 2 is a diagram schematically illustrating a state in which an object S is irradiated with line-shaped light L.

DESCRIPTION OF EMBODIMENTS

Hereinafter, embodiments of a shape measurement apparatus will be described in detail with reference to the accompanying drawings. In the description of the drawings, the same elements will be denoted by the same reference signs, and redundant description will be omitted. The present invention is not limited to these examples.

Figure 1:
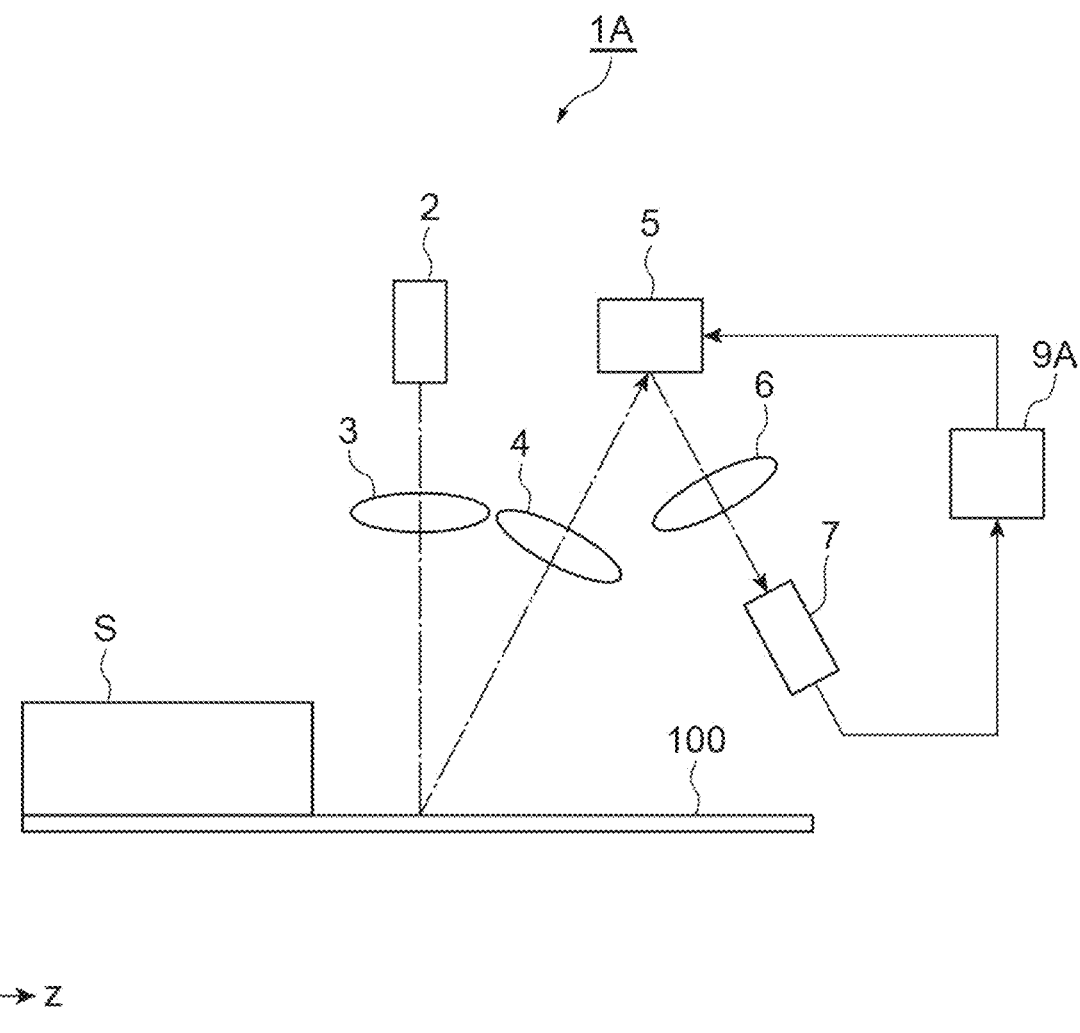
FIG. 1 is a diagram illustrating a configuration of a shape measurement apparatus 1A according to a first embodiment.

FIG. 1 is a diagram illustrating a configuration of a shape measurement apparatus 1A according to a first embodiment. The shape measurement apparatus 1A is an apparatus for measuring a shape of an object S being transported by a transport mechanism 100, and includes a light source 2, an irradiation optical system 3, an imaging optical system 4, a spatial light modulator 5, a focusing optical system 6, a linear sensor 7, and a processing unit 9A.

The transport mechanism 100 is, for example, a conveyor belt on which the object S is placed and for relatively transporting the object. In this diagram, for convenience of explanation, an xyz orthogonal coordinate system in which a transport direction is set as the z direction is illustrated. A direction perpendicular to a surface on which the object S is placed is set as the y direction.

The light source 2 outputs light with which the object S is to be irradiated. The light source 2 may be an arbitrary light source, and is, for example, a laser diode or a light emitting diode. The irradiation optical system 3 forms the light output from the light source 2 into a line shape extending in a first direction (x direction), and irradiates the object S with the light. The irradiation optical system 3 may be configured to include a cylindrical lens. The transport direction (z direction) of the object S by the transport mechanism 100 is different from the direction (x direction) in which the line-shaped light with which the object S is irradiated by the irradiation optical system 3 extends. FIG. 2 is a diagram schematically illustrating a state in which the object S is irradiated with the line-shaped light L.

The imaging optical system 4 inputs and forms an image of the light with which the object S is irradiated by the irradiation optical system 3 and reflected by the object S in a direction different from the irradiation direction. The imaging optical system 4 may be configured to include a spherical lens. In this case, the image of the line-shaped light L on the object S by the imaging optical system 4 is viewed in a direction different from the irradiation direction on the object S, and thus, it corresponds to the shape of the object S.

The spatial light modulator 5 inputs the light passed through the imaging optical system 4 on a light modulation plane, spatially intensity-modulates the input light based on an intensity modulation pattern, and outputs the modulated light. In the spatial light modulator 5, a two-dimensional intensity modulation pattern may be set on the light modulation plane, and further, in the present embodiment, a one-dimensional intensity modulation pattern in a direction different from the first direction (x direction) is set.

The intensity modulation pattern may be set at random, or may be set based on a Hadamard matrix or the like. The spatial light modulator 5 may be of a reflection type as illustrated in FIG. 1, or may be of a transmission type. Further, the spatial light modulator 5 may be a digital micromirror device (DMD) manufactured by the MEMS technique, or may be a spatial light modulator using a liquid crystal.

The focusing optical system 6 inputs the light output from the spatial light modulator 5, and focuses the input light in a line shape extending in the first direction (x direction). The focusing optical system 6 may be configured to include a cylindrical lens.

The linear sensor 7 includes a plurality of pixels arrayed one-dimensionally. Each of the plurality of pixels includes a photodiode for generating charges by receiving light. The linear sensor 7 receives the light focused in the line shape by the focusing optical system 6 by the plurality of pixels, and outputs a signal according to a light receiving amount of each of the plurality of pixels.

The processing unit 9A sequentially sets a plurality of intensity modulation patterns in the spatial light modulator 5. The processing unit 9A performs analysis by the compressive sensing technique for each of the plurality of pixels of the linear sensor 7 based on the signal output from the linear sensor 7 when the intensity modulation pattern is set to each of the plurality of intensity modulation patterns in the spatial light modulator 5.

The processing unit 9A obtains the image of the line-shaped light L on the object S by the imaging optical system 4, and obtains the shape of the object S by the analysis described above. Further, the processing unit 9A may obtain the three-dimensional shape of the object S by obtaining the shape of the object S at each position of the object S when transporting the object by the transport mechanism 100.

The processing unit 9A may be a computer. The processing unit 9A includes a storage unit (for example, a hard disk drive, a RAM, a ROM, and the like) for storing the intensity modulation pattern and the reconstructed image obtained by the analysis, a display unit (for example, a liquid crystal display and the like) for displaying the intensity modulation pattern and the reconstructed image, an input unit (for example, a keyboard, a mouse, and the like) for receiving instructions for starting measurement and inputs of measurement conditions, and a control unit (for example, a CPU, a FPGA, and the like) for controlling an operation of the entire apparatus.

Figure 3:
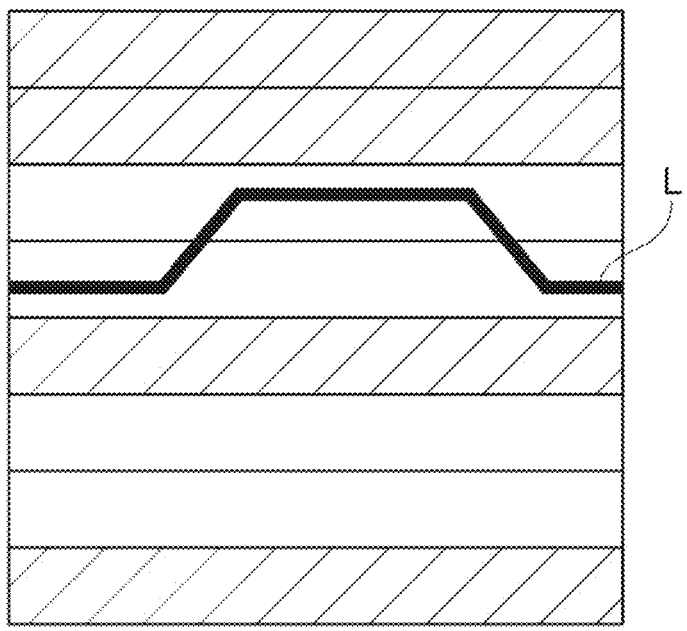
FIG. 3 is a diagram illustrating an image of the line-shaped light L on a light modulation plane of a spatial light modulator 5 and an intensity modulation pattern.

FIG. 3 is a diagram illustrating the image of the line-shaped light L on the light modulation plane of the spatial light modulator 5 and the intensity modulation pattern. In this diagram, a plurality of rectangles divided in the vertical direction illustrate pixels on the light modulation plane of the spatial light modulator 5. The intensity modulation pattern is represented by presence or absence of hatching in each pixel. The spatial light modulator 5, for example, does not cause the light input to the pixel with hatching to be incident on the linear sensor 7, and causes the light input to the pixel without hatching to be incident on the linear sensor 7.

Figure 4:
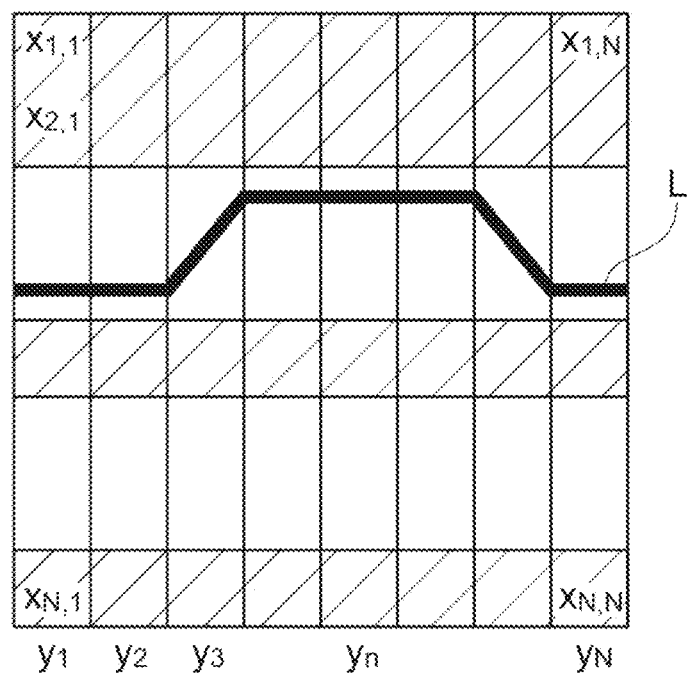
FIG. 4 is a diagram illustrating a relationship between the image of the line-shaped light L on the light modulation plane of the spatial light modulator 5 and each pixel of a linear sensor 7.

FIG. 4 is a diagram illustrating a relationship between the image of the line-shaped light L on the light modulation plane of the spatial light modulator 5 and each pixel of the linear sensor 7. In this diagram, a plurality of rectangles divided in the horizontal direction schematically illustrate pixels of the linear sensor 7. The light input to the n-th pixel of the linear sensor 7 is the light arriving from a region corresponding to the n-th pixel of the linear sensor 7 in the pixels (pixels without hatching) specified by the intensity modulation pattern on the light modulation plane of the spatial light modulator 5 illustrated in FIG. 3.

Hereinafter, the number of pixels of the spatial light modulator 5 is set to N, the number of pixels of the linear sensor 7 is set to N, and the number of intensity modulation patterns is set to M. A matrix representing the intensity modulation patterns is set to $\Phi$, a signal value output from the linear sensor 7 is set to y, and an image to be reconstructed by the compressive sensing technique (an image on the light modulation plane of the spatial light modulator 5) is set to x. In this case, a relationship of the following Formula (1) holds therebetween.

[Formula 1]

$$y = \Phi x \quad (1)$$

The following Formula (2) is a formula specifically representing the above Formula (1) with respect to the signal value from the first pixel of the linear sensor 7. Further, the following Formula (3) is a formula specifically representing the above Formula (1) with respect to the signal value from the second pixel of the linear sensor 7. There is such a formula for each pixel of the linear sensor 7.

[Formula 2]

$$\begin{pmatrix} y_{1,1} \\ \cdot \\ \cdot \\ \cdot \\ y_{1,M} \end{pmatrix} = \begin{pmatrix} \phi_{1,1} & \cdot & \phi_{1,N} \\ \cdot & \cdot & \cdot \\ \cdot & \cdot & \cdot \\ \cdot & \cdot & \cdot \\ \phi_{M,1} & \cdot & \phi_{M,N} \end{pmatrix} \begin{pmatrix} x_{1,1} \\ \cdot \\ \cdot \\ \cdot \\ x_{N,1} \end{pmatrix} \quad (2)$$

[Formula 3]

$$\begin{pmatrix} y_{2,1} \\ \cdot \\ \cdot \\ \cdot \\ y_{2,M} \end{pmatrix} = \begin{pmatrix} \phi_{1,1} & \cdot & \phi_{1,N} \\ \cdot & \cdot & \cdot \\ \cdot & \cdot & \cdot \\ \cdot & \cdot & \cdot \\ \phi_{M,1} & \cdot & \phi_{M,N} \end{pmatrix} \begin{pmatrix} x_{1,2} \\ \cdot \\ \cdot \\ \cdot \\ x_{N,2} \end{pmatrix} \quad (3)$$

In the above formula, $y_{n,m}$ represents the signal value from the n-th pixel in the N pixels of the linear sensor 7 when the m-th intensity modulation pattern in the M intensity modulation patterns is used. $x_{n1,n2}$ represents the light intensity of the region of the n1-th pixel in the N pixels of the spatial light modulator 5 and corresponding to the n2-th pixel in the N pixels of the linear sensor 7. $\phi_{m,n}$ represents the light intensity modulation of the n-th pixel of the spatial light modulator 5 when the m-th intensity modulation pattern is used. m is an integer of 1 or more and M or less. Each of n, n1, and n2 is an integer of 1 or more and N or less.

When M=N, and the inverse matrix of the matrix $\Phi$ exists, the image x for each column is uniquely obtained. On the other hand, when M<N, the above Formula becomes the underdetermined system, and the image x for each column cannot be mathematically solved.

However, even in the case of M<N, when the image x for each column is sparse (or becomes sparse by linear transform such as Fourier transform), it is possible to reconstruct the image x by the compressive sensing technique. Specifically, the image x can be reconstructed by solving the optimization problem represented by the following Formula (4) for each column. $\lambda$ is a parameter representing an allowable value of an error.

[Formula 4]

$$\arg\min_{x \in R^N} \frac{1}{2} \|\Phi x - y\|_2^2 + \lambda \|x\|_1 \quad (4)$$

In the present embodiment, when reconstructing the image of the line-shaped light L on the light modulation plane of the spatial light modulator 5 illustrated in FIG. 3, the image is obtained by applying the compressive sensing technique for each column. That is, in the present embodiment, the sparsity of the entire image is not used as a constraint, but the image is divided into the plurality of columns and the sparsity of each column is used as a constraint, and therefore, it is possible to reduce possibility that a column in which all values are 0 exists, and accuracy of image reconstruction is high.

In the present embodiment, the spatial light modulator 5 capable of setting the one-dimensional intensity modulation pattern is used, and thus, the apparatus can be configured at low cost, power consumption can be reduced, and a frame rate can be increased. Further, in the present embodiment, the compressive sensing technique is applied to each column, and thus, parallel processing is possible, and the frame rate can be further increased by performing the parallel processing.

In the present embodiment, when the line light in the image on the light modulation plane is sufficiently thin compared to the size of the pixel of the spatial light modulator 5, it is possible to measure the height position with one pixel accuracy. However, the image can be reconstructed even when the line light thicker than the pixel size of the spatial light modulator 5 is made incident, and thus, the height position can be measured with sub pixel accuracy by further performing centroid calculation.

Figure 5:
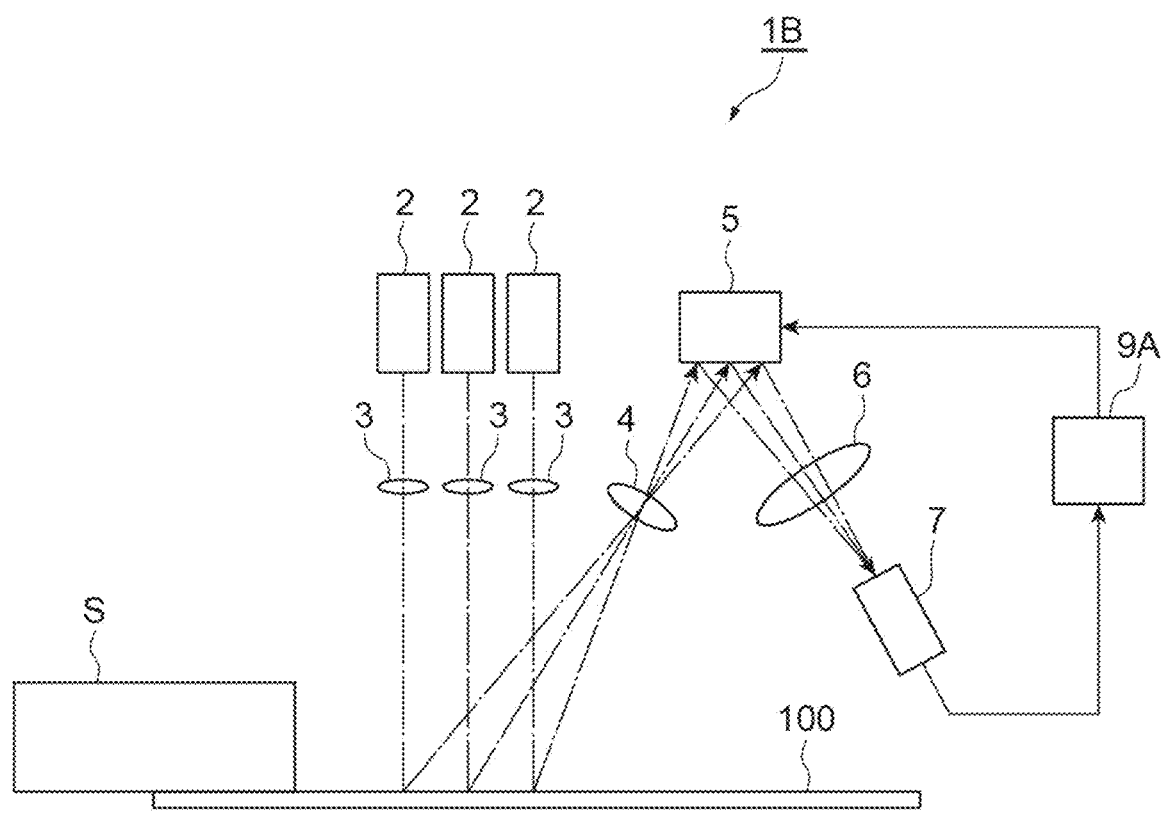
FIG. 5 is a diagram illustrating a configuration of a shape measurement apparatus 1B according to a second embodiment.

FIG. 5 is a diagram illustrating a configuration of a shape measurement apparatus 1B according to a second embodiment. As compared with the shape measurement apparatus 1A of the first embodiment (FIG. 1), the shape measurement apparatus 1B of the second embodiment (FIG. 5) is different in that the apparatus includes a plurality of sets of the light sources 2 and the irradiation optical systems 3, and a plurality of light beams are each formed into a line shape extending in the first direction (x direction), and the object S is irradiated with the light beams.

Figure 6:
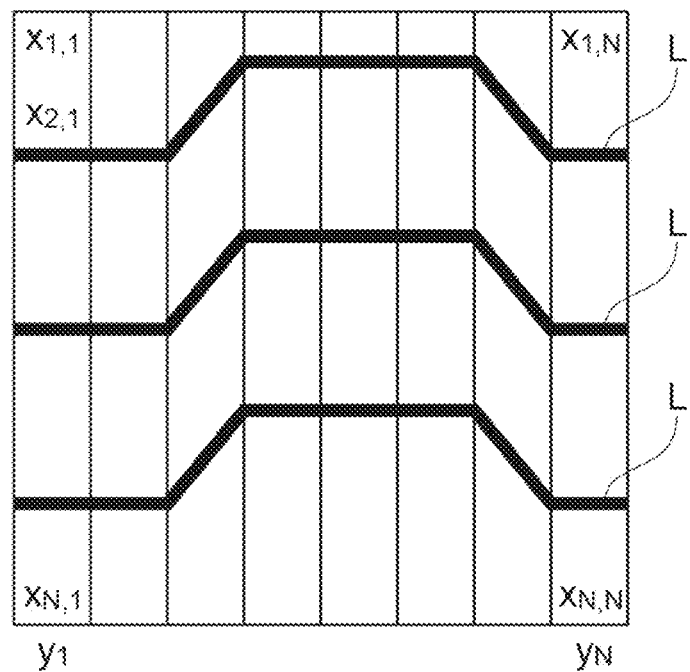
FIG. 6 is a diagram illustrating the image of the line-shaped light L on the light modulation plane of the spatial light modulator 5.

FIG. 6 is a diagram illustrating the image of the line-shaped light L on the light modulation plane of the spatial light modulator 5 in the case of the second embodiment. In the second embodiment, as illustrated in this diagram, a plurality of images of line-shaped light beams L appear on the light modulation plane of the spatial light modulator 5, and further, when the image x for each column is sparse (or becomes sparse by linear transform such as Fourier transform), it is possible to reconstruct the image x by the compressive sensing technique in the same manner as in the first embodiment. Further, in the second embodiment, the number of times of measurement can be reduced by using the plurality of line-shaped light beams, and thus, it is possible to reduce the measurement time.

Figure 7:
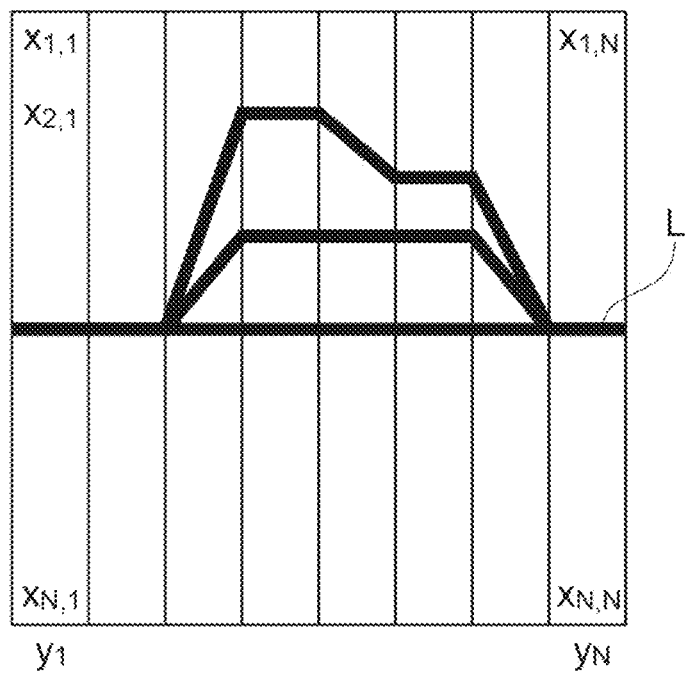
FIG. 7 is a diagram illustrating another example of the image of the line-shaped light L on the light modulation plane of the spatial light modulator 5.

FIG. 7 is a diagram illustrating another example of the image of the line-shaped light L on the light modulation plane of the spatial light modulator 5. The image in this diagram is obtained, for example, when the object includes a translucent object such as glass, and an object located behind the translucent object. In this case, the light reflected by the translucent object and the light transmitted through the translucent object and reflected by the object behind may be incident on the light modulation plane of the spatial light modulator 5. Even in the above case also, when the image x for each column is sparse (or becomes sparse by linear transform such as Fourier transform), it is possible to reconstruct the image x by the compressive sensing technique in the same manner as in the first embodiment.

Figure 8:
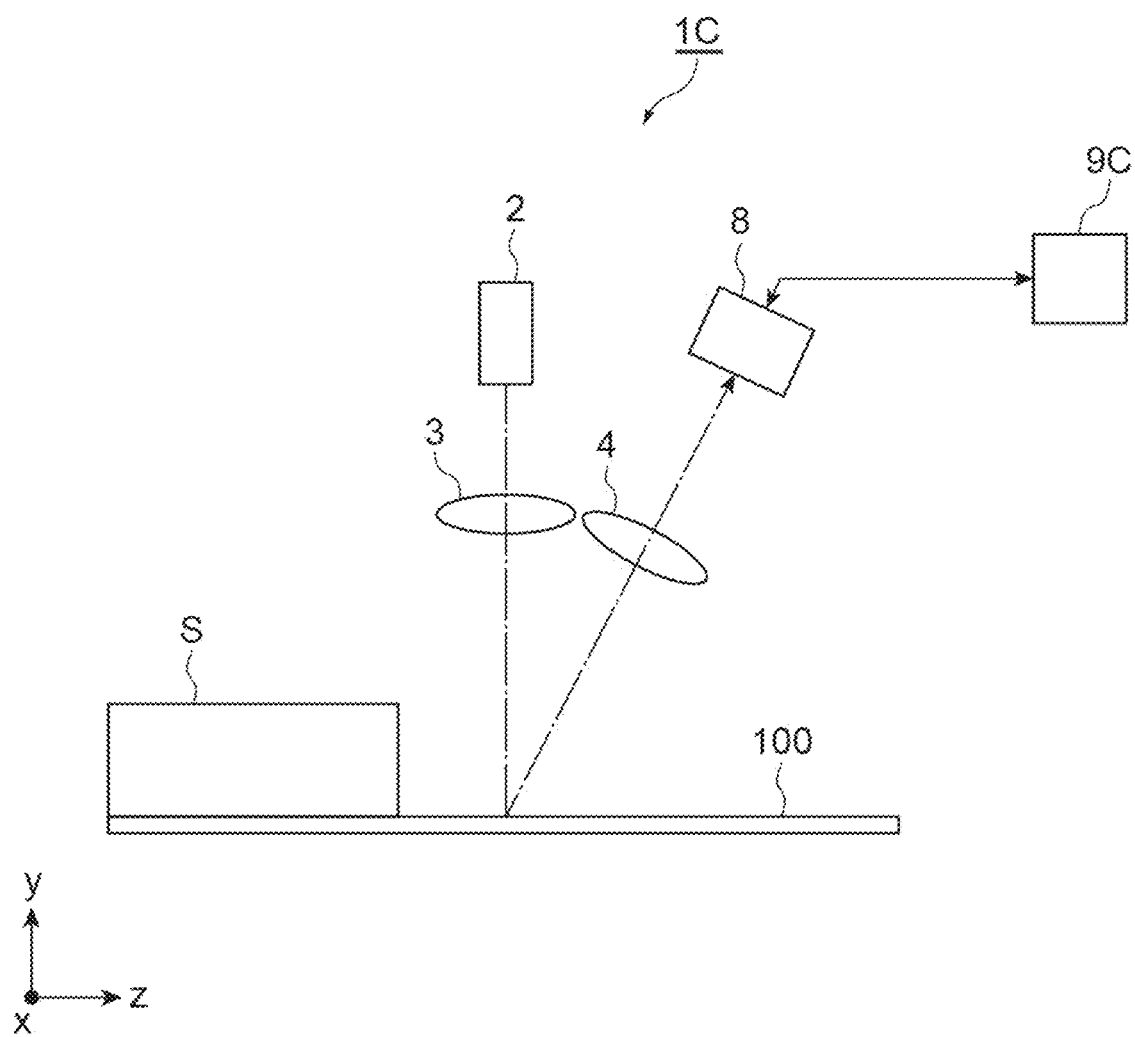
FIG. 8 is a diagram illustrating a configuration of a shape measurement apparatus 1C according to a third embodiment.

FIG. 8 is a diagram illustrating a configuration of a shape measurement apparatus 1C according to a third embodiment. The shape measurement apparatus 1C is an apparatus for measuring the shape of the object S being transported by the transport mechanism 100, and includes the light source 2, the irradiation optical system 3, the imaging optical system 4, an area sensor 8, and a processing unit 9C. As compared with the shape measurement apparatus 1A of the first embodiment (FIG. 1), the shape measurement apparatus 1C of the third embodiment (FIG. 8) is different in that the area sensor 8 is provided in place of the spatial light modulator 5, the focusing optical system 6, and the linear sensor 7, and different in that the processing unit 9C is provided in place of the processing unit 9A.

The area sensor 8 includes a plurality of pixels arrayed two-dimensionally. Each of the plurality of pixels includes a photodiode for generating charges by receiving light. The area sensor 8 receives the light passed through the imaging optical system 4 by the plurality of pixels.

The area sensor 8 integrates a signal according to a light receiving amount of each of the pixels in a row in which a control signal applied to each row has a first logical value in a column direction, and outputs the integrated signal for each column. Further, the area sensor 8 may integrate the signal according to the light receiving amount of each of the pixels in a row in which the control signal applied to each row has a second logical value in the column direction, and output the integrated signal for each column. One of the first logical value and the second logical value is a logical value H, and the other is a logical value L.

The processing unit 9C sequentially sets a plurality of patterns of the control signal applied to each row in the area sensor 8. The processing unit 9C performs analysis by the compressive sensing technique for each column of the area sensor 8 based on the signal integrated and output for each column from the area sensor 8 when the control signal is set to each of the plurality of patterns of the control signal in the area sensor 8. In addition, the processing unit 9C may perform the analysis by the compressive sensing technique for each column of the area sensor 8 based on the signal integrated and output for each column from the area sensor 8 when the control signal has each of the first logical value and the second logical value when the control signal is set to each of the plurality of patterns of the control signal in the area sensor 8.

The processing unit 9C obtains the image of the line-shaped light L on the object S by the imaging optical system 4, and further, obtains the shape of the object S, by the analysis described above. Further, the processing unit 9C may obtain the three-dimensional shape of the object S by obtaining the shape of the object S at each position of the object S when the object S is transported by the transport mechanism 100.

Figure 9:
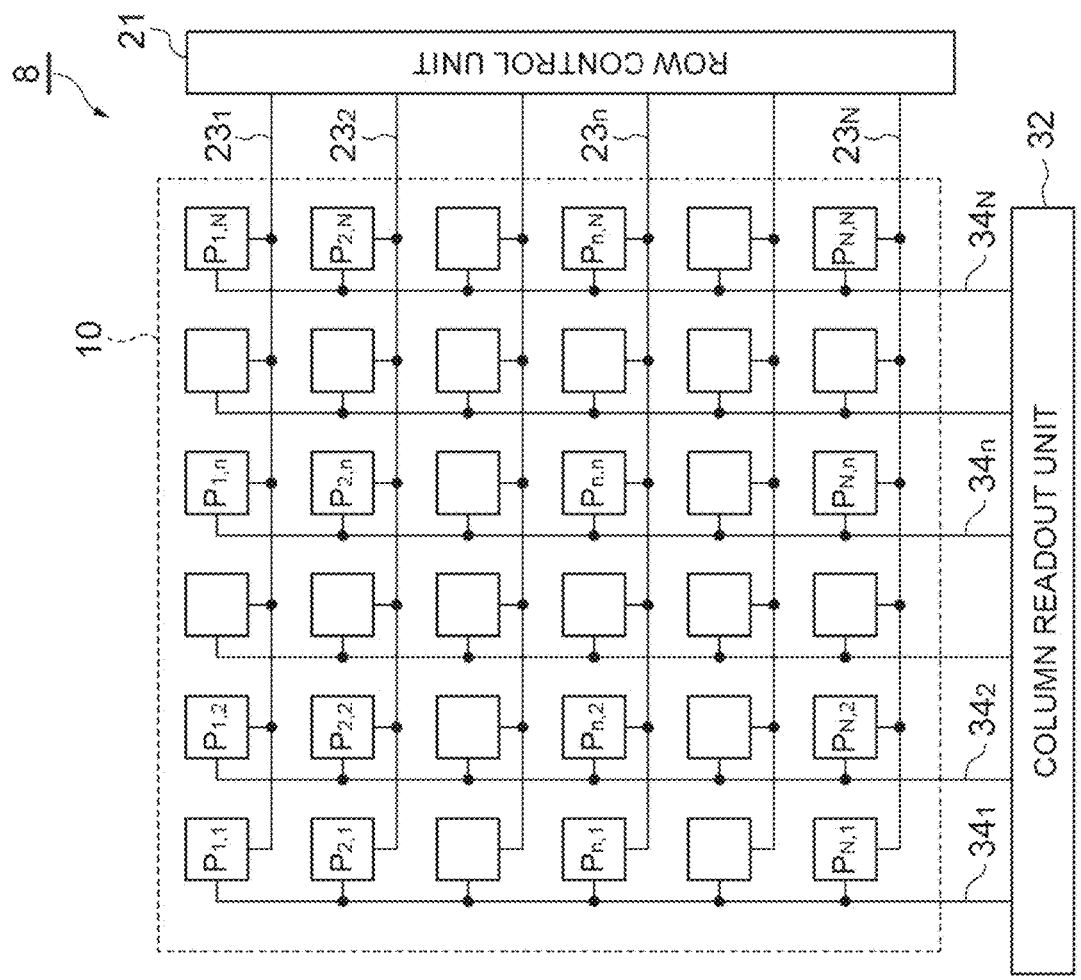
FIG. 9 is a diagram illustrating a configuration of an area sensor 8.

FIG. 9 is a diagram illustrating a configuration of the area sensor 8. The area sensor 8 includes a pixel array unit 10, a row control unit 21, and a column readout unit 32.

The pixel array unit 10 includes $N^2$ pixels $P_{1,1}$ to $P_{N,N}$ being arrayed two-dimensionally. The $N^2$ pixels $P_{1,1}$ to $P_{N,N}$ have a common configuration. The pixel $P_{n1,n2}$ is located at an n1-th row and an n2-th column. Each of the pixels includes a photodiode for generating charges in response to light receiving, and a switch for selecting whether to output the charges generated in the photodiode. In addition, N is an integer of 2 or more. Each of n, n1, and n2 is an integer of 1 or more and N or less.

The row control unit 21 is coupled to the N pixels $P_{n,1}$ to $P_{n,N}$ of the n-th row by an n-th row control line $23_n$. The row control unit 21 applies an n-th row control signal to the N pixels $P_{n,1}$ to $P_{n,N}$ of the n-th row via the n-th row control line $23_n$. The row control unit 21 specifies the row in which the charges generated in the photodiode are to be output by the first to N-th row control signals.

The column readout unit 32 is coupled to the N pixels $P_{1,n}$ to $P_{N,n}$ of the n-th column by an n-th column output line $34_n$. The column readout unit 32 inputs the charges output from any pixel in the N pixels $P_{1,n}$ to $P_{N,n}$ of the n-th column via the n-th column output line $34_n$. The column readout unit 32 may include a charge amplifier for outputting a voltage value according to an amount of input charges, and an AD converter for outputting a digital value according to the voltage value output from the charge amplifier.

In the area sensor 8, any of the first row to N-th row is selected by the control signal output from the row control unit 21, and the charges output from the N pixels $P_{n,1}$ to $P_{n,N}$ of the selected row are input to the column readout unit 32 via the first to N-th column output lines $34_1$ to $34_N$. In this case, when a plurality of rows are selected, the charges output to the n-th column output line $34_n$ from the pixels of the selected rows are added and input to the column readout unit 32.

Figure 10:
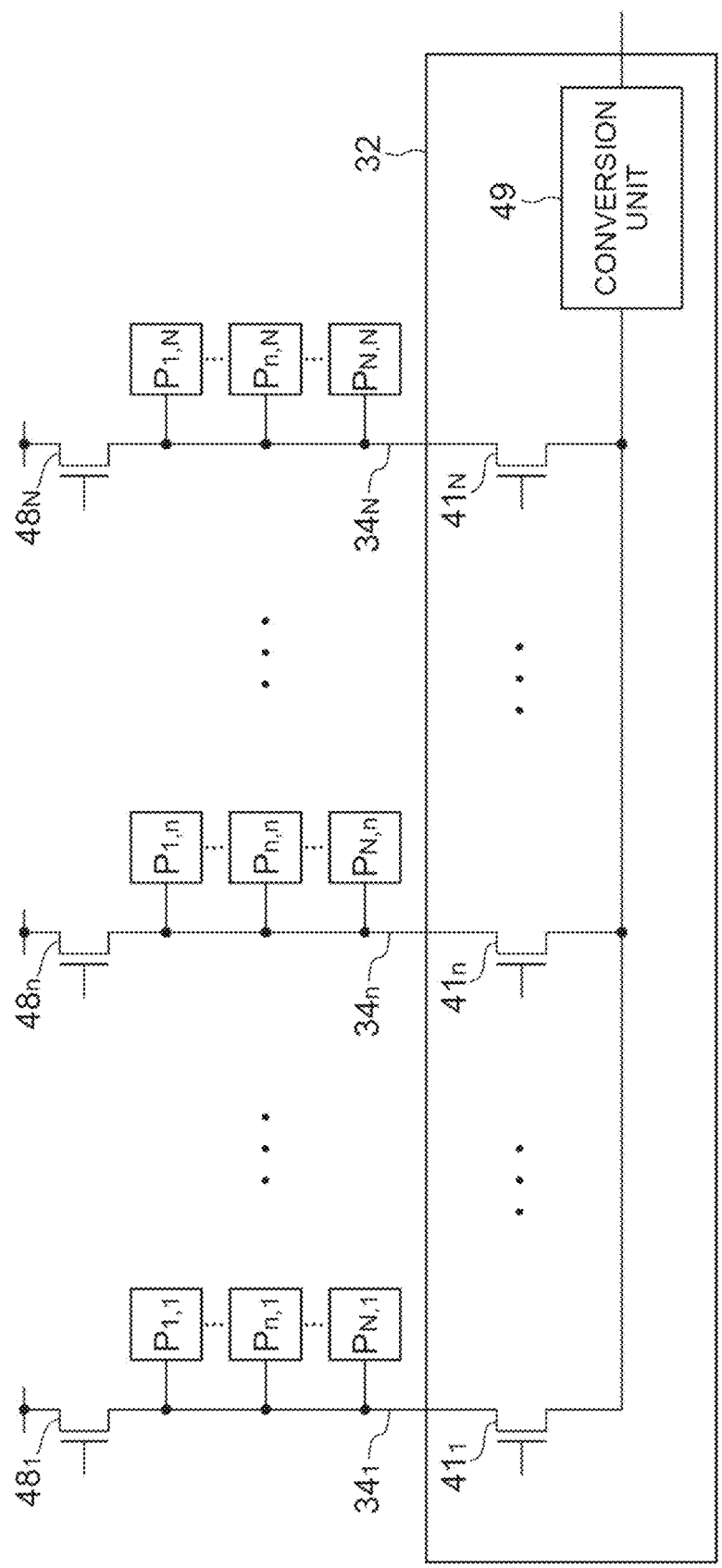
FIG. 10 is a diagram illustrating a circuit configuration example of a column readout unit 32.

Next, a circuit configuration example of the column readout unit 32 will be described with reference to FIG. 10 to FIG. 12. FIG. 10 is a diagram illustrating a circuit configuration example of the column readout unit 32. The column readout unit 32 illustrated in this diagram includes NMOS transistors $41_1$ to $41_N$ and a conversion unit 49.

A drain of the NMOS transistor $41_n$ is connected to the n-th column output line $34_n$. A source of the NMOS transistor $41_n$ is connected to the conversion unit 49. The NMOS transistor $41_n$ operates as a switch in which a conductive state (ON) or a non-conductive state (OFF) is set between the drain and the source according to a level of a signal applied to a gate.

The conversion unit 49 is connected to the source of each of the NMOS transistors $41_1$ to $41_N$. The conversion unit 49 includes a charge amplifier for outputting a voltage value according to an amount of input charges, and an AD converter for outputting a digital value according to the voltage value output from the charge amplifier.

When any one of the NMOS transistors $41_1$ to $41_N$ is in the ON state, the charges output from any one pixel of the N pixels $P_{1,n}$ to $P_{N,n}$ of the n-th column connected via the NMOS transistor $41_n$ in the ON state and the n-th column output line $34_n$ are input to the conversion unit 49, and the digital value according to the charge amount is output from the conversion unit 49. The NMOS transistors $41_1$ to $41_N$ may be in the ON state at the same time, or may be sequentially in the ON state one by one.

In this diagram, NMOS transistors $48_1$ to $48_N$ are additionally illustrated. A drain of the NMOS transistor $48_n$ is connected to a power potential supply terminal. A source of the NMOS transistor $48_n$ is connected to the n-th column output line $34_n$. The NMOS transistor $48_n$ also operates as a switch. When the NMOS transistor $48_n$ is in the ON state, the charges generated in the photodiode of each of the N pixels $P_{1,n}$ to $P_{N,n}$ of the n-th column connected to the n-th column output line $34_n$ can be initialized.

Figure 11:
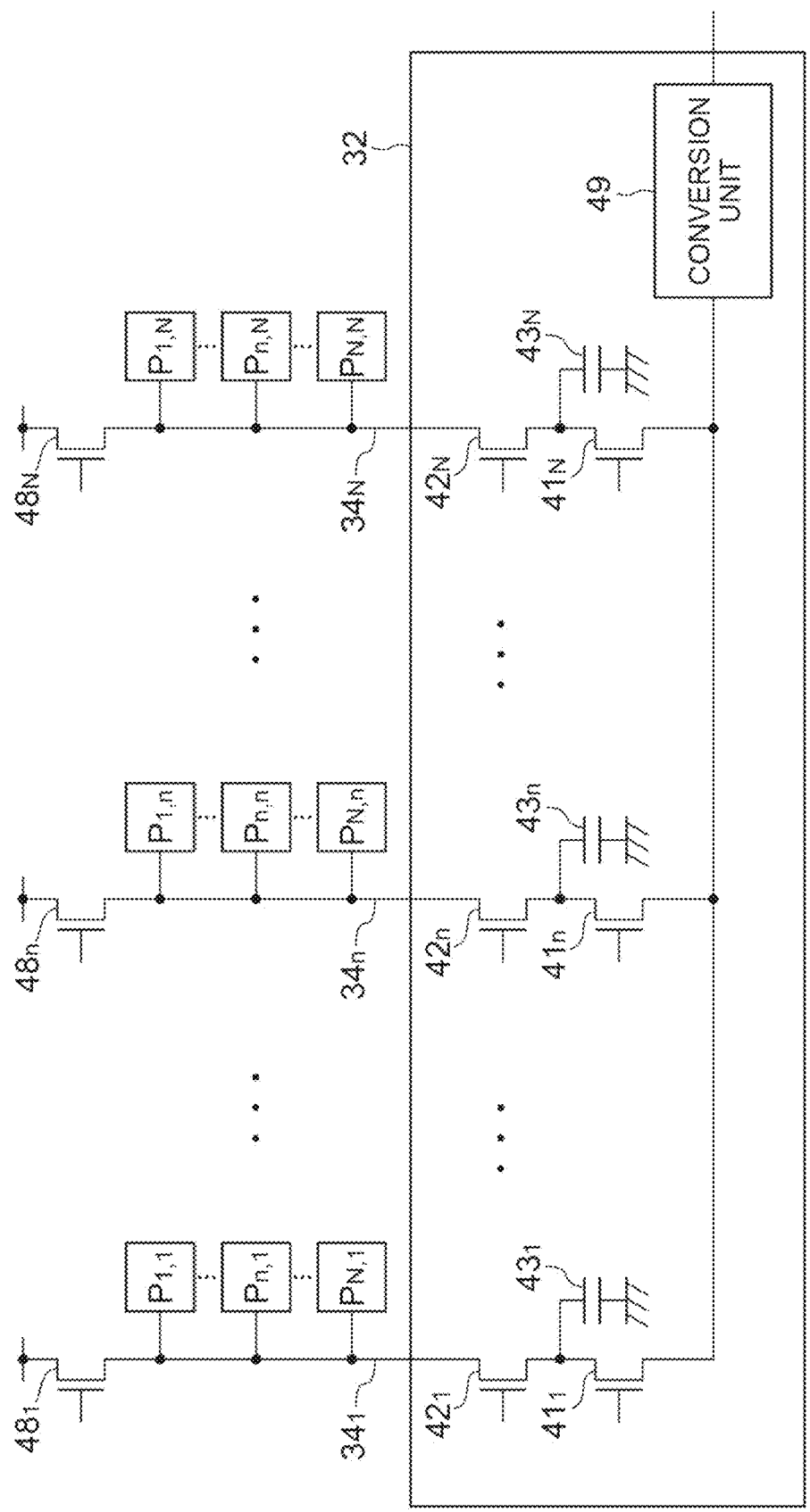
FIG. 11 is a diagram illustrating another circuit configuration example of the column readout unit 32.

FIG. 11 is a diagram illustrating another circuit configuration example of the column readout unit 32. The column readout unit 32 illustrated in this diagram includes NMOS transistors $42_1$ to $42_N$ and capacitors $43_1$ to $43_N$, in addition to the NMOS transistors $41_1$ to $41_N$ and the conversion unit 49.

A drain of the NMOS transistor $42_n$ is connected to the n-th column output line $34_n$. A source of the NMOS transistor $42_n$ is connected to the drain of the NMOS transistor $41_n$. The capacitor $43_n$ is provided between the source of the NMOS transistor $42_n$ and a ground potential supply terminal. The NMOS transistor $42_n$ also operates as a switch.

In this circuit configuration example, when the NMOS transistor $41_n$ is in the OFF state, and the NMOS transistor $42_n$ is in the ON state, the charges arriving from the n-th column output line $34_n$ are transferred to and accumulated in the capacitor $43_n$. Thereafter, when the NMOS transistor $42_n$ is in the OFF state, and the NMOS transistor $41_n$ is in the ON state, the charges accumulated in the capacitor $43_n$ are input to the conversion unit 49, and the digital value according to the charge amount is output from the conversion unit 49. The NMOS transistors $41_1$ to $41_N$ may also be in the ON state at the same time, or may be sequentially in the ON state one by one.

Figure 12:
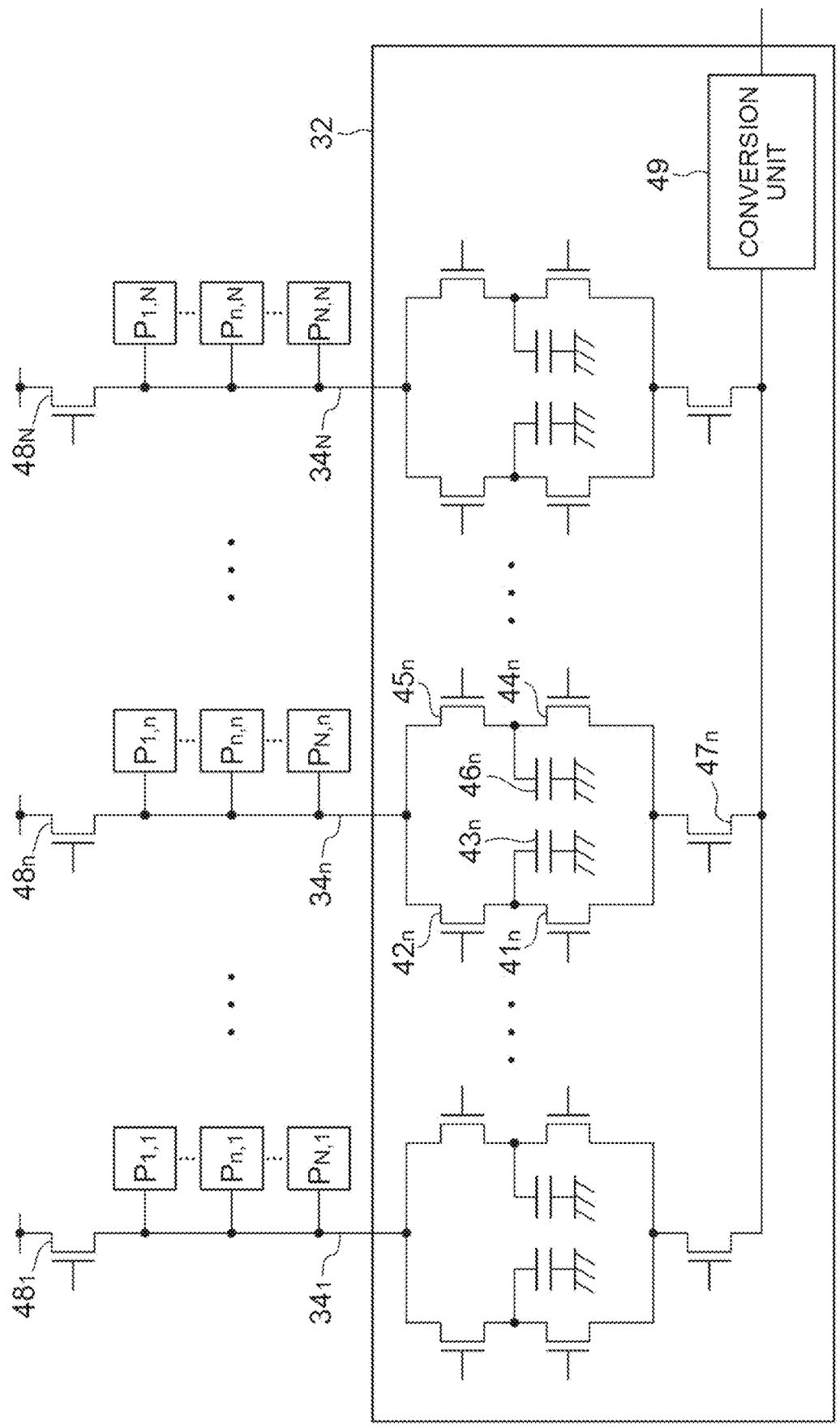
FIG. 12 is a diagram illustrating still another circuit configuration example of the column readout unit 32.

FIG. 12 is a diagram illustrating still another circuit configuration example of the column readout unit 32. The column readout unit 32 illustrated in this diagram includes the NMOS transistors $41_1$ to $41_N$, the NMOS transistors $42_1$ to $42_N$, the capacitors $43_1$ to $43_N$, NMOS transistors $44_1$ to $44_N$, NMOS transistors $45_1$ to $45_N$, capacitors $46_1$ to $46_N$, NMOS transistors $47_1$ to $47_N$, and the conversion unit 49.

The NMOS transistors $44_n$, $45_n$, and the capacitor $46_n$ have the same configuration as the NMOS transistors $41_n$, $42_n$, and the capacitor $43_n$. A drain of the NMOS transistor $47_n$ is connected to the source of each of the NMOS transistors $41_n$ and $44_n$. The conversion unit 49 is connected to the source of each of the NMOS transistors $47_1$ to $47_N$.

In this circuit configuration example, the two capacitors $43_n$ and $46_n$ are provided for the n-th column output line $34_n$, and thus, in the period in which the charges arriving from the n-th column output line $34_n$ are transferred to and accumulated in one capacitor, the charges accumulated in the other capacitor are input to the conversion unit 49, and the digital value according to the charge amount is output from the conversion unit 49.

For example, when the NMOS transistors $41_n$ and $45_n$ are in the OFF state, and the NMOS transistor $42_n$ is in the ON state, the charges arriving from the n-th column output line $34_n$ are transferred to and accumulated in the capacitor $43_n$, further, when the NMOS transistors $44_n$ and $47_n$ are in the ON state, the charges accumulated in the capacitor $46_n$ are input to the conversion unit 49, and the digital value according to the charge amount is output from the conversion unit 49.

In addition, the conversion unit for outputting the digital value according to the charge amount may be only one unit provided in the column readout unit 32, or may be provided for each column in the column readout unit 32.

Next, a circuit configuration example of the row control unit 21 will be described. The row control unit 21 may input the first to N-th row control signals $X_1$ to $X_N$ in parallel, and output the n-th row control signal $X_n$ to the n-th row control line $23_n$, or further, may input the first to N-th row control signals $X_1$ to $X_N$ as serial data, and output the n-th row control signal $X_n$ to the n-th row control line $23_n$. Preferably, the row control unit 21 may be configured as illustrated in FIG. 13.

Figure 13:
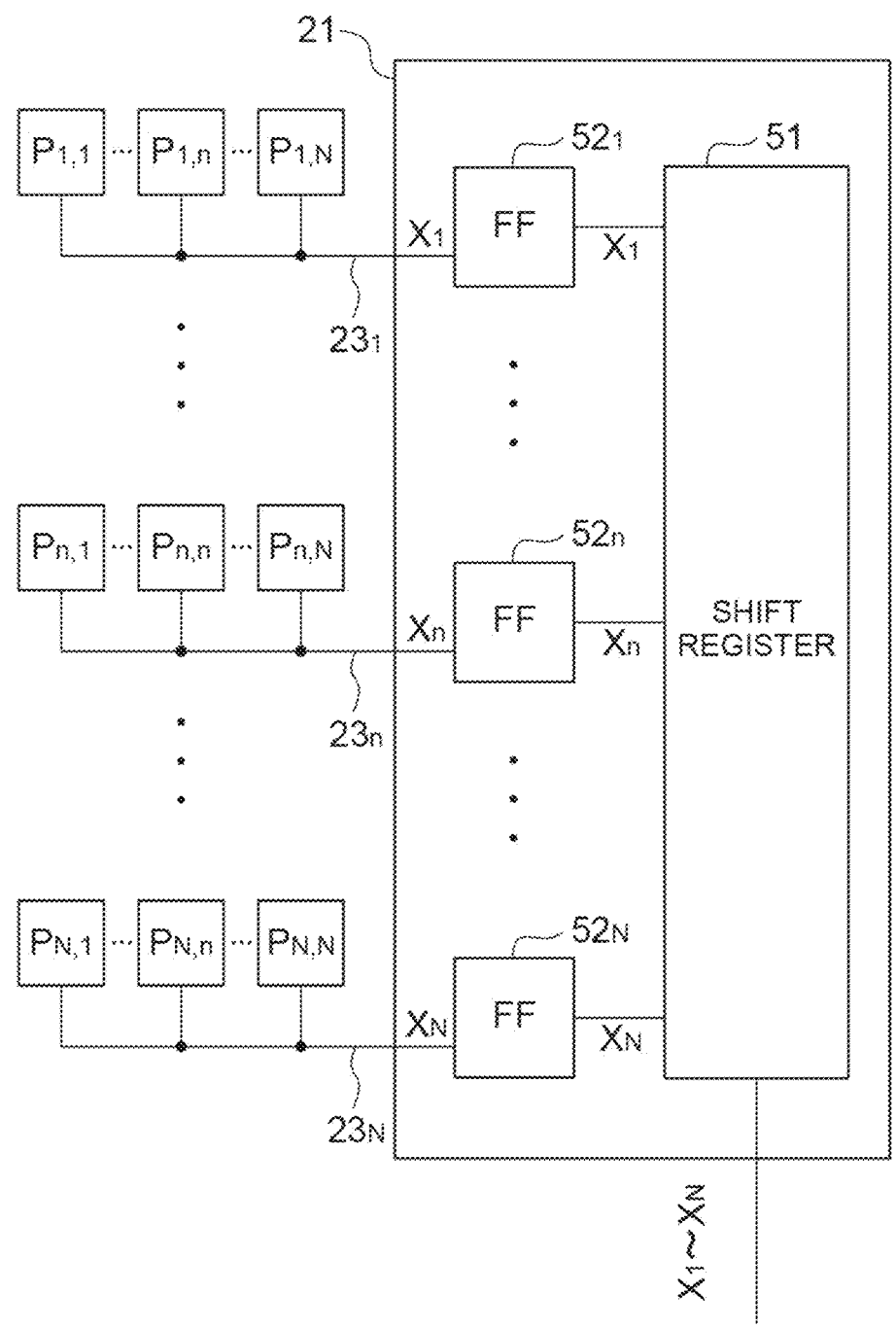
FIG. 13 is a diagram illustrating a circuit configuration example of a row control unit 21.

FIG. 13 is a diagram illustrating a circuit configuration example of the row control unit 21. The row control unit 21 illustrated in this diagram includes a shift register 51 and flip-flops $52_1$ to $52_N$. The shift register 51 serially inputs the first to N-th row control signals $X_1$ to $X_N$, and outputs the n-th row control signal $X_n$ to the flip-flop $52_n$. The flip-flop $52_n$ latches the n-th row control signal $X_n$ output from the shift register 51, and outputs the latched n-th row control signal $X_n$ to the n-th row control line $23_n$.

The flip-flop $52_n$ is preferably an RS flip-flop. In this case, when latch is ON, the flip-flop $52_n$ can output the latched n-th row control signal $X_n$ to the n-th row control line $23_n$. When set is ON, the flip-flop $52_n$ can reset the pixels $P_{n,1}$ to $P_{n,N}$ by outputting the logical value H to the n-th row control line $23_n$. Further, when reset is ON, the flip-flop $52_n$ can set the pixels $P_{n,1}$ to $P_{n,N}$ to OFF by outputting the logical value L to the n-th row control line $23_n$.

As in this circuit configuration example, when the row control unit 21 includes the shift register 51 and the flip-flops $52_1$ to $52_N$, in the period of outputting the n-th row control signal $X_n$ from the flip-flop $52_n$ to the n-th row control line $23_n$, the shift register 51 can serially input the next first to N-th row control signals $X_1$ to $X_N$.

Figure 14:
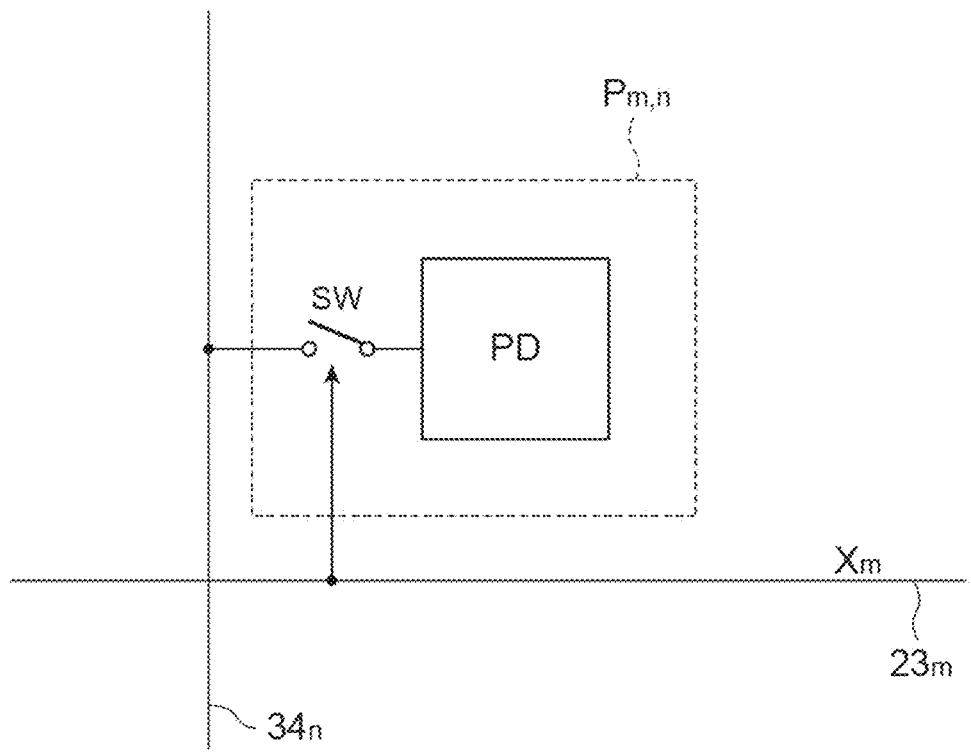
FIG. 14 is a diagram illustrating a circuit configuration example of a pixel $P_{m,n}$.

Next, a circuit configuration example of the pixel $P_{m,n}$ will be described. The pixel $P_{m,n}$ includes the photodiode for generating the charges by receiving light, and further, includes the switch for selecting whether or not to output the charges generated in the photodiode to the column output line. FIG. 14 is a diagram illustrating a circuit configuration example of the pixel $P_{m,n}$. The pixel $P_{m,n}$ illustrated in this diagram includes a photodiode PD and a switch SW. The switch SW may be constituted by a MOS transistor.

The switch SW is provided between the photodiode PD and the column output line $34_n$. When the row control signal $X_m$ being sent from the row control unit 21 via the row control line $23_m$ has the logical value H, the switch SW is in the ON state, and the charges generated in the photodiode PD are output to the column output line $34_n$. When the row control signal $X_m$ has the logical value L, the switch SW is in the OFF state, and the charges generated in the photodiode PD are not output to the column output line $34_n$.

In the circuit configuration example of the pixel $P_{m,n}$ illustrated in FIG. 14, the charges can be read out from all the pixels by inverting the logical value of each row control signal $X_m$. Thus, the measurement time can be shortened. FIG. 15 to FIG. 18 are diagrams illustrating timing configuration examples from exposure to readout in the case where the charges are output from all the pixels.

Figure 15:
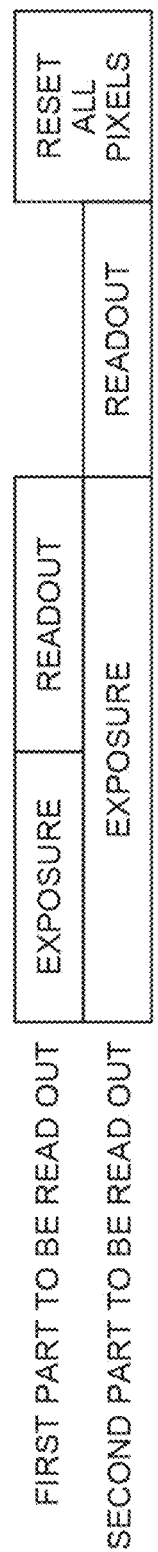
FIG. 15 is a diagram illustrating a timing configuration example from exposure to readout in the case where charges are output from all the pixels when the pixel $P_{m,n}$ is set as the circuit configuration example illustrated in FIG. 14.

In the timing configuration example illustrated in FIG. 15, all the pixels start the exposure at the same time, and the charges are read out from the pixels in one or a plurality of rows after a lapse of a predetermined period. After the charge readout of the first time is completed, the charges are read out from the pixels in the other rows (the pixels in the rows in which the charge readout of the first time is not performed). Although the exposure time is different between the pixel of the row in which the charge readout is performed in the first time and the pixel of the row in which the charge readout is performed in the second time, the difference of the exposure time can be easily corrected when solving the optimization problem according to the compressive sensing technique.

The above timing configuration may be applied to the case of the circuit configuration example of the column readout unit 32 illustrated in FIG. 10.

Figure 16:
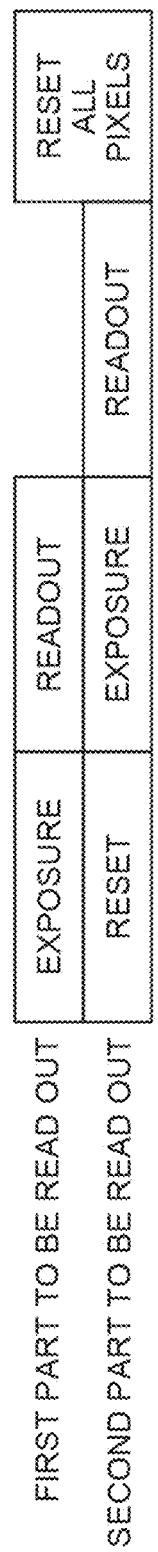
FIG. 16 is a diagram illustrating a timing configuration example from exposure to readout in the case where charges are output from all the pixels when the pixel $P_{m,n}$ is set as the circuit configuration example illustrated in FIG. 14.

In the timing configuration example illustrated in FIG. 16, the exposure time of all the pixels is made constant by performing reset of each pixel at appropriate timing. The charges are read out from the pixels in the one or plurality of rows in which the exposure of the predetermined period is completed. After the charge readout of the first time is completed, the charges are read out from the pixels in the other rows (the pixels in the rows in which the charge readout of the first time is not performed).

The above timing configuration may be applied to the case of the circuit configuration example of the column readout unit 32 illustrated in FIG. 11, and may be applied when the exposure time is equal to or longer than the readout time.

Figure 17:
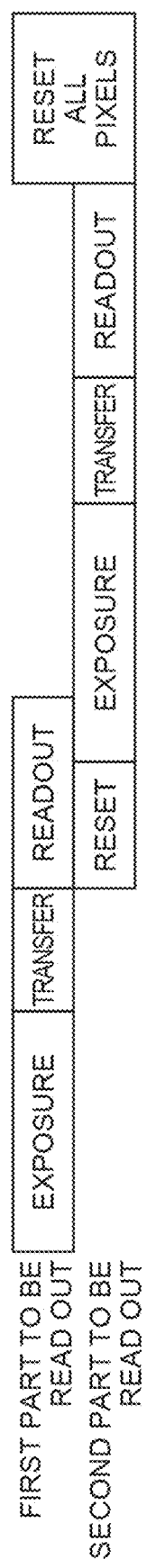
FIG. 17 is a diagram illustrating a timing configuration example from exposure to readout in the case where charges are output from all the pixels when the pixel $P_{m,n}$ is set as the circuit configuration example illustrated in FIG. 14.

In the timing configuration example illustrated in FIG. 17 also, the exposure time of all the pixels is made constant by performing reset of each pixel at appropriate timing. The charges are transferred to the column readout unit 32 from the pixels in the one or plurality of rows in which the exposure of the predetermined period is completed, and then, the digital value according to the charge amount is output from the column readout unit 32. After the charge transfer of the first time is completed, in the pixels in the other rows (the pixels in the rows in which the charge readout of the first time is not performed), after the reset and the exposure of the predetermined period are performed, the charges are transferred to the column readout unit 32, and then, the digital value according to the charge amount is output from the column readout unit 32.

The above timing configuration may be applied to the case of the circuit configuration example of the column readout unit 32 illustrated in FIG. 11, and may be applied even when the exposure time is shorter than the readout time.

Figure 18:
FIG. 18 is a diagram illustrating a timing configuration example from exposure to readout in the case where charges are output from all the pixels when the pixel $P_{m,n}$ is set as the circuit configuration example illustrated in FIG. 14.

In the timing configuration example illustrated in FIG. 18 also, the exposure time of all the pixels is made constant by performing reset of each pixel at appropriate timing. The charges are transferred to the column readout unit 32 from the pixels in the one or plurality of rows in which the exposure of the predetermined period is completed, and then, the digital value according to the charge amount is output from the column readout unit 32. In the pixels in the other rows (the pixels in the rows in which the charge readout of the first time is not performed), after the reset and the exposure of the predetermined period are performed, the charges are transferred to the column readout unit 32, and then, the digital value according to the charge amount is output from the column readout unit 32. After the charge transfer of the first time, the charge transfer of the second time is performed.

The above timing configuration may be applied to the case of the circuit configuration example of the column readout unit 32 illustrated in FIG. 12.

Figure 19:
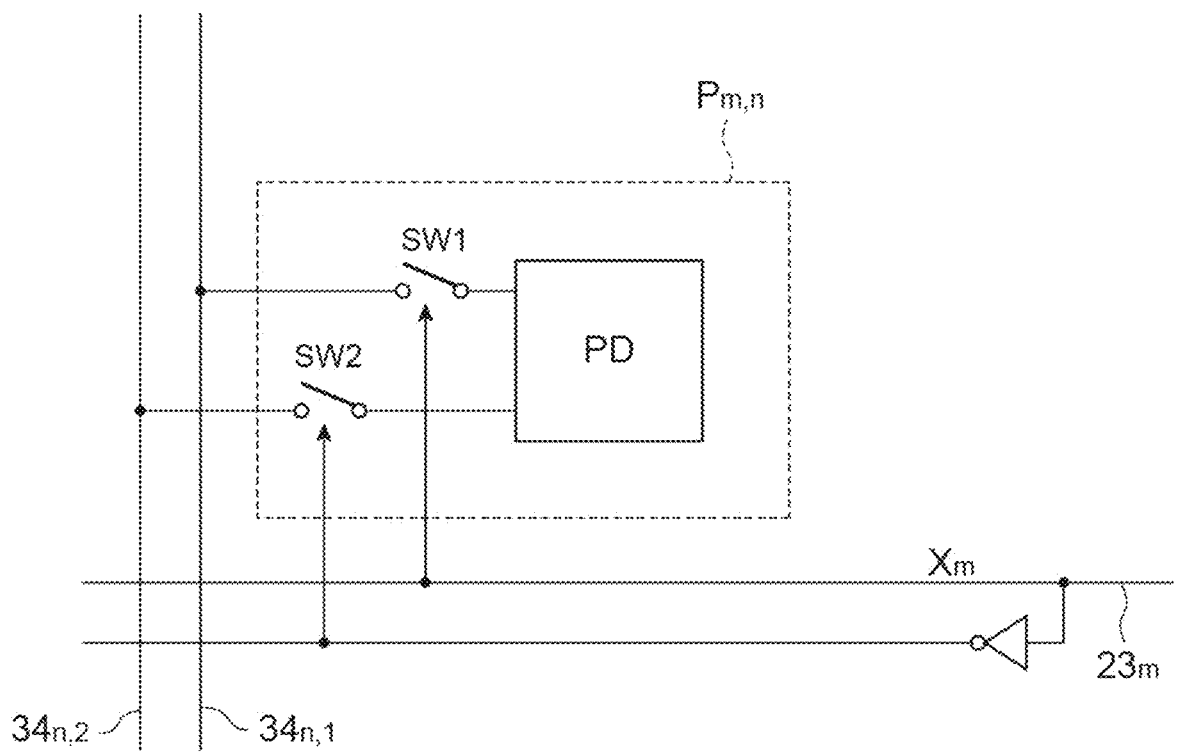
FIG. 19 is a diagram illustrating another circuit configuration example of the pixel $P_{m,n}$.

Next, another circuit configuration example of the pixel $P_{m,n}$ will be described. FIG. 19 is a diagram illustrating another circuit configuration example of the pixel $P_{m,n}$. The pixel $P_{m,n}$ illustrated in this diagram includes a photodiode PD and two switches SW1 and SW2. Each of the switches SW1 and SW2 may be constituted by a MOS transistor.

When the row control signal $X_m$ has the logical value H, the switch SW1 is in the ON state, and the switch SW2 is in the OFF state. When the row control signal $X_m$ has the logical value L, the switch SW1 is in the OFF state, and the switch SW2 is in the ON state. When one of the switches SW1 and SW2 is in the ON state, the other is in the OFF state. When the switch SW1 is in the ON state, the charges generated in the photodiode PD are output to the column output line $34_{n,1}$. When the switch SW2 is in the ON state, the charges generated in the photodiode PD are output to the column output line $34_{n,2}$.

In this circuit configuration example, the area sensor 8 can integrate the signal according to the light receiving amount of each of the pixels in the row in which the control signal applied to each row has the logical value H in the column direction, and output the integrated signal to the column output line for each column, and further, can integrate the signal according to the light receiving amount of each of the pixels in the row in which the control signal applied to each row has the logical value L in the column direction, and output the integrated signal to the other column output line for each column.

In addition, the processing unit 9C can obtain the shape of the object S by performing the analysis by the compressive sensing technique for each column of the area sensor 8 based on the signal integrated and output for each column from the area sensor 8 for each logical value of the control signal when the control signal is set to each of the plurality of patterns of the control signal in the area sensor 8. Thus, the measurement time can be shortened.

In the present embodiment also, when reconstructing the image of the line-shaped light L on the light receiving surface of the area sensor 8, the image is obtained by applying the compressive sensing technique for each column. That is, in the present embodiment also, the sparsity of the entire image is not used as a constraint, but the image is divided into the plurality of columns and the sparsity of each column is used as a constraint, and therefore, it is possible to reduce possibility that a column in which all values are 0 exists, and accuracy of image reconstruction is high.

In the present embodiment, it is not necessary to use the spatial light modulator, and thus, the apparatus can be easily configured further at low cost, and power consumption can be further reduced. Further, in the present embodiment also, the compressive sensing technique is applied to each column, and thus, parallel processing is possible, and the frame rate can be further increased by performing the parallel processing.

In the present embodiment also, when the line light in the image on the light receiving surface is sufficiently thin compared to the size of the pixel of the area sensor 8, it is possible to measure the height position with one pixel accuracy. However, the image can be reconstructed even when the line light thicker than the pixel size of the area sensor 8 is made incident, and thus, the height position can be measured with sub pixel accuracy by further performing centroid calculation.

Figure 20:
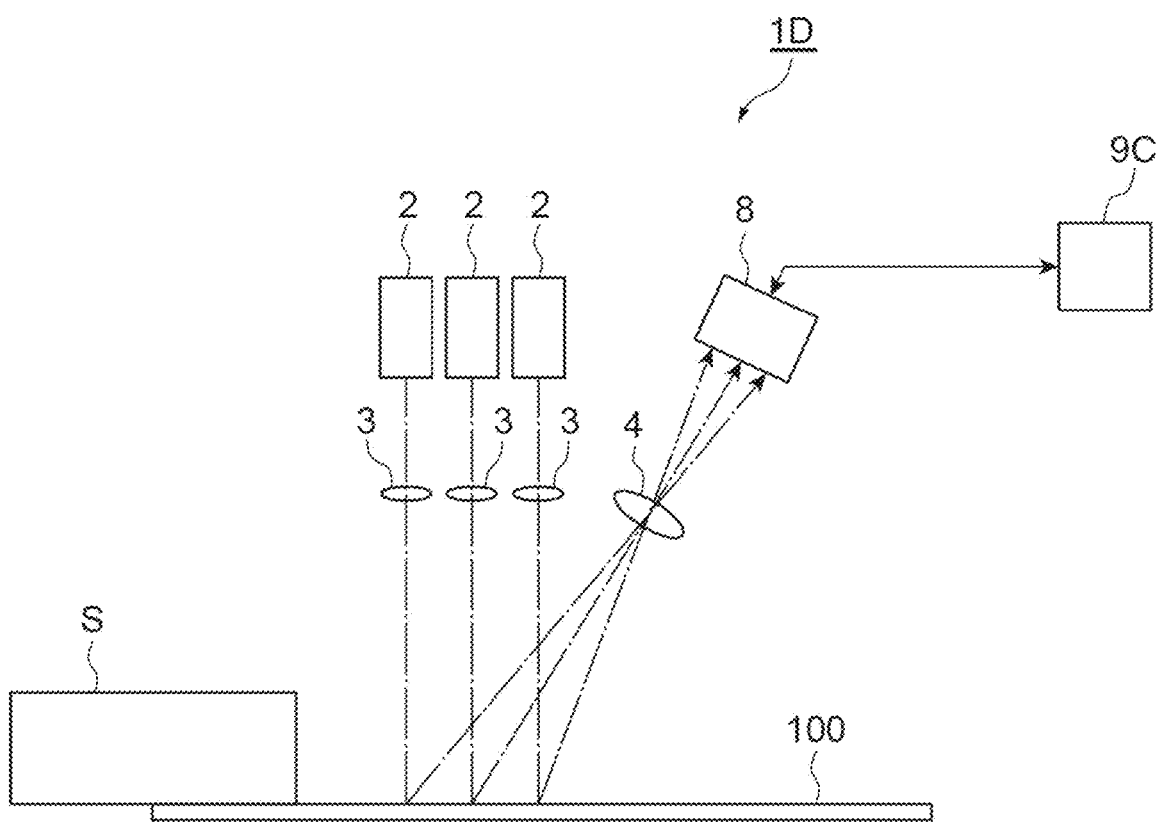
FIG. 20 is a diagram illustrating a configuration of a shape measurement apparatus 1D according to a fourth embodiment.

FIG. 20 is a diagram illustrating a configuration of a shape measurement apparatus 1D according to a fourth embodiment. As compared with the shape measurement apparatus 1C of the third embodiment (FIG. 8), the shape measurement apparatus 1D of the fourth embodiment (FIG. 20) is different in that the apparatus includes a plurality of sets of the light sources 2 and the irradiation optical systems 3, and a plurality of light beams are each formed into a line shape extending in the first direction (x direction), and the object S is irradiated with the light beams.

The image of the line-shaped light L on the light receiving surface of the area sensor 8 in the case of the fourth embodiment is similar to that illustrated in FIG. 6. In the fourth embodiment, as illustrated in FIG. 6, a plurality of images of line-shaped light beams L appear on the light receiving surface of the area sensor 8, and further, when the image x for each column is sparse (or becomes sparse by linear transform such as Fourier transform), it is possible to reconstruct the image x by the compressive sensing technique in the same manner as in the third embodiment. Further, in the fourth embodiment, the number of times of measurement can be reduced by using the plurality of line-shaped light beams, and thus, it is possible to reduce the measurement time.

Further, for example, when the object includes a translucent object such as glass, and an object located behind the translucent object, even when the image of the line-shaped light L on the light receiving surface of the area sensor 8 is as illustrated in FIG. 7, when the image x for each column is sparse (or becomes sparse by linear transform such as Fourier transform), it is possible to reconstruct the image x by the compressive sensing technique in the same manner as in the first embodiment.

The shape measurement apparatus is not limited to the embodiments and configuration examples described above, and various modifications are possible.

The shape measurement apparatus of a first aspect of the above embodiment is an apparatus for measuring a shape of an object, and includes (1) a light source for outputting light; (2) an irradiation optical system for forming the light output from the light source into a line shape extending in a first direction, and irradiating an object with the light; (3) an imaging optical system for inputting and forming an image of the light with which the object is irradiated by the irradiation optical system and reflected by the object in a direction different from an irradiation direction; (4) a spatial light modulator in which a one-dimensional intensity modulation pattern in a direction different from the first direction is set, and for inputting the light passed through the imaging optical system, and spatially intensity-modulating and outputting the input light based on the intensity modulation pattern; (5) a focusing optical system for inputting the light output from the spatial light modulator, and focusing the input light in a line shape extending in the first direction; (6) a linear sensor including a plurality of pixels each including a photodiode and arrayed one-dimensionally, and for receiving the light focused in the line shape by the focusing optical system by the plurality of pixels, and outputting a signal according to a light receiving amount of each of the plurality of pixels; and (7) a processing unit for obtaining a shape of the object by performing analysis by a compressive sensing technique for each of the plurality of pixels of the linear sensor based on the signal output from the linear sensor when the intensity modulation pattern is set to each of a plurality of intensity modulation patterns in the spatial light modulator.

The shape measurement apparatus of a second aspect of the above embodiment is an apparatus for measuring a shape of an object, and includes (1) a light source for outputting light; (2) an irradiation optical system for forming the light output from the light source into a line shape extending in a first direction, and irradiating an object with the light; (3) an imaging optical system for inputting and forming an image of the light with which the object is irradiated by the irradiation optical system and reflected by the object in a direction different from an irradiation direction; (4) an area sensor including a plurality of pixels each including a photodiode and arrayed two-dimensionally, and for receiving the light passed through the imaging optical system by the plurality of pixels, integrating a signal according to a light receiving amount of each of the pixels in a row in which a control signal applied to each row has a first logical value in a column direction, and outputting the signal for each column; and (5) a processing unit for obtaining a shape of the object by performing analysis by a compressive sensing technique for each column of the area sensor based on the signal integrated and output for each column from the area sensor when the control signal is set to each of a plurality of patterns of the control signal in the area sensor.

In the above shape measurement apparatus of the second aspect, the area sensor may integrate the signal according to the light receiving amount of each of the pixels in a row in which the control signal applied to each row has a second logical value in the column direction, and output the signal for each column, and the processing unit may obtain the shape of the object by performing the analysis by the compressive sensing technique for each column of the area sensor based on the signal integrated and output for each column from the area sensor for each logical value of the control signal when the control signal is set to each of the plurality of patterns of the control signal in the area sensor.

In the above shape measurement apparatus of the first or second aspect, the irradiation optical system may form a plurality of light beams each into a line shape extending in the first direction, and irradiate the object with the light beams.

The above shape measurement apparatus of the first or second aspect may further include a transport mechanism for relatively transporting the object in a direction different from the first direction, and the processing unit may obtain the shape of the object at each position of the object when transporting the object by the transport mechanism.

INDUSTRIAL APPLICABILITY

The embodiments can be used as a shape measurement apparatus capable of reconstructing a shape of an object with high accuracy using the light section method and the compressive sensing technique.

REFERENCE SIGNS LIST 1A-1D—shape measurement apparatus, 2—light source, 3—irradiation optical system, 4—imaging optical system, 5—spatial light modulator, 6—focusing optical system, 7—linear sensor, 8—area sensor, 9A, 9C—processing unit, 10—pixel array unit, 21—row control unit, 23 row control line, 32—column readout unit, 34—column output line, $P_{1,1}$-$P_{N,N}$—pixel, 100—transport mechanism.

The invention claimed is:

1. A shape measurement apparatus for measuring a shape of an object, the apparatus comprising:
a light source configured to output light;
an irradiation optical system including a cylindrical lens and configured to form the light output from the light source into a line shape extending in a first direction by the cylindrical lens, and irradiate an object with the light;
an imaging optical system including a lens and configured to input and form an image of the light with which the object is irradiated by the irradiation optical system and reflected by the object in a direction different from an irradiation direction by the lens;
a spatial light modulator in which a one-dimensional intensity modulation pattern in a direction different from the first direction is set, and configured to input the light passed through the imaging optical system, and spatially intensity-modulate and output the input light based on the intensity modulation pattern;
a focusing optical system including a cylindrical lens and configured to input the light output from the spatial light modulator, and focus the input light in a line shape extending in the first direction by the cylindrical lens;
a linear sensor including a plurality of pixels each including a photodiode and arrayed one-dimensionally, and configured to receive the light focused in the line shape by the focusing optical system by the plurality of pixels, and output a signal according to a light receiving amount of each of the plurality of pixels; and
a processor configured to obtain a shape of the object by performing analysis by a compressive sensing technique for each of the plurality of pixels of the linear sensor based on the signal output from the linear sensor when the intensity modulation pattern is set to each of a plurality of intensity modulation patterns in the spatial light modulator.

2. The shape measurement apparatus according to claim 1, wherein the irradiation optical system is configured to form a plurality of light beams each into a line shape extending in the first direction, and irradiate the object with the light beams.

3. The shape measurement apparatus according to claim 1, further comprising a transport mechanism configured to relatively transport the object in a direction different from the first direction, wherein
the processor is configured to obtain the shape of the object at each position of the object when transporting the object by the transport mechanism.

* * * * *